United States Patent [19]
Kalkoske et al.

[11] Patent Number: 5,908,187
[45] Date of Patent: Jun. 1, 1999

[54] CONNECTOR SYSTEM FOR MOUNTING AN EXHAUST PIPE TO A TRUCK CAB

[75] Inventors: Michael J. Kalkoske, Renton; Michael T. Russell, Kirkland; Wayne K. Simons, Kent, all of Wash.

[73] Assignee: Paccar Inc., Bellevue, Wash.

[21] Appl. No.: 08/491,748

[22] Filed: Jun. 19, 1995

[51] Int. Cl.⁶ .................................................. F16M 13/00
[52] U.S. Cl. ........................... 248/635; 248/60; 248/613
[58] Field of Search .................................. 248/635, 609, 248/638, 610, 569, 570, 602, 60, 62, 613, 74.3, 230.7; 180/309, 296, 89.2

[56] References Cited

U.S. PATENT DOCUMENTS

| | | | |
|---|---|---|---|
| 1,862,483 | 6/1932 | Lord | 248/635 X |
| 2,227,306 | 12/1940 | Guy | 248/613 |
| 2,308,969 | 1/1943 | Riesing | 248/613 |
| 2,389,562 | 11/1945 | Storch | 248/613 |
| 2,772,126 | 11/1956 | Guy | 248/60 X |
| 2,905,417 | 9/1959 | Grabe | 248/60 |
| 3,014,681 | 12/1961 | Feil, Jr. | 248/60 |
| 3,155,361 | 11/1964 | Balan | 248/610 X |
| 4,359,126 | 11/1982 | Aiba | 180/296 X |
| 5,310,158 | 5/1994 | Cassel | 248/62 X |

FOREIGN PATENT DOCUMENTS

| | | | |
|---|---|---|---|
| 1600440 | 2/1970 | Germany | 248/613 |

*Primary Examiner*—Leslie A. Braun
*Assistant Examiner*—Anita M. King
*Attorney, Agent, or Firm*—Seed and Berry LLP

[57] ABSTRACT

The inventive device is a connector for mounting a vertical exhaust pipe to a truck cab. In one embodiment, the connector includes a bracket, a resilient member, a rigid bushing, a rod, and a clamp. The bracket is mountable to the cab in the proximity of the exhaust pipe. The resilient member is coupled to the bracket, and the bushing is coupled to the resilient member. The rod has an upper end and a lower end, and it is positioned through the bushing. The clamp has a brace attached to an end of the rod and a clasp that is attachable to the exhaust pipe. The rod is moveable axially through the bushing to correspond to vertical displacement between the cab and the exhaust pipe, but the rod is substantially prevented from moving laterally with respect to the cab to substantially prevent lateral displacement between the exhaust pipe and the cab. The resilient member is made from a material that dampens vibrations from the exhaust pipe to reduce noise in the cab.

20 Claims, 3 Drawing Sheets

CONNECTOR SYSTEM FOR MOUNTING AN EXHAUST PIPE TO A TRUCK CAB

FIELD OF THE INVENTION

The present invention relates to a connector for mounting a vertical exhaust pipe to a cab of a truck.

BACKGROUND OF THE INVENTION

Truck exhaust pipes are commonly mounted to extend vertically next to the cab to conform to regulations for hauling certain loads and to enhance the aesthetics of the vehicle, Trucks for hauling food products, for example, must expel the exhaust at a point that is positioned above the load to prevent the exhaust from contaminating the food products. Truckers also like to have bright, shiny chrome exhaust pipes next to the cab to enhance the appearance their trucks. Thus, it is generally desirable to mount exhaust pipes to extend vertically next to the cab.

When trucks have an air cab suspension, however, several problems arise in connection with vertically mounted exhaust pipes. A significant amount of vertical and lateral displacement occurs between vertically mounted exhaust pipes and the cab because the exhaust pipes are mounted to the frame of the vehicle while the cab is mounted to a separate air suspension system. The largest displacement between an exhaust pipe and a cab happens when frame "racking" occurs such that one frame member is displaced with respect to the other. Racking can cause up to 3.0" of vertical displacement between the pipes and the cab. A lesser amount of displacement occurs when the truck goes over bumps or potholes in the road surface. Accordingly, the upper end of vertical exhaust pipes should be secured to the outer wall of the cab to prevent damage to the pipes and cab.

Conventional mounting systems do not adequately secure vertical pipes to the cab. In securing the upper end of a vertical pipe to the cab, lateral displacement should be limited because it causes torsional stresses in the exhaust pipe and the exhaust pipe may bang against the cab in extreme conditions. Vertical displacement, on the other hand, should be freely allowed because restricting vertical displacement causes too quality of the ride in the cab. Conventional U-bolts and Fabreeka tethers do not adequately limit lateral displacement between the pipes and the cab. Conventional brackets that are fixedly attached to the cab and the pipe do not allow for sufficient vertical displacement. Accordingly it would be desirable to develop a connector for mounting a vertical exhaust pipe to a cab that adequately limits lateral displacement while allowing sufficient vertical displacement between the pipe and the cab.

Most conventional systems also transmit an excessive amount of noise to the cab. U-bolts and fixed brackets provide a highly conductive path for transmitting exhaust noise and engine vibrations from the exhaust pipe to the cab. Therefore, it would be desirable to develop a connector for mounting a vertical exhaust pipe to a cab that minimizes the transmission of vibrations from the exhaust pipe into the cab.

SUMMARY OF THE INVENTION

The inventive device is a connector for mounting a vertical exhaust pipe to a truck cab. The connector includes a bracket, a clamp having a brace and a clasp, and a means for coupling the bracket to the clamp. The bracket is mountable to a wall of the truck cab, and the clasp is fixedly attachable to the exhaust pipe at a selected position that generally corresponds to the position of the bracket on the cab wall. The coupling means is attached to the bracket and the brace such that the coupling means allows significant vertical displacement between the exhaust pipe and the cab, while substantially preventing lateral movement therebetween.

In one embodiment, the connector includes a bracket, a resilient member, a rigid bushing, a rod, and a clamp. The bracket is mountable to the cab in the proximity of the exhaust pipe. The resilient member is coupled to the bracket, and the bushing is coupled to the resilient member. The rod has an upper end and a lower end, and it is positioned through the bushing. The clamp has a brace attached to an end of the rod and a clasp that is attachable to the exhaust pipe. The rod is moveable axially through the bushing to correspond to vertical displacement between the cab and the exhaust pipe, but the rod is substantially prevented from moving laterally with respect to the cab to substantially prevent lateral displacement between tile exhaust pipe and the cab. The resilient member is made from a material that dampens vibrations from the exhaust pipe to reduce noise in the cab.

DETAILED DESCRIPTION OF THE INVENTION

FIGS. 1–4 illustrate a connector 10 for mounting a vertical exhaust pipe 12 to a wall 14 of a truck cab. Like reference numbers refer to like parts throughout the various figures.

Figure 1:
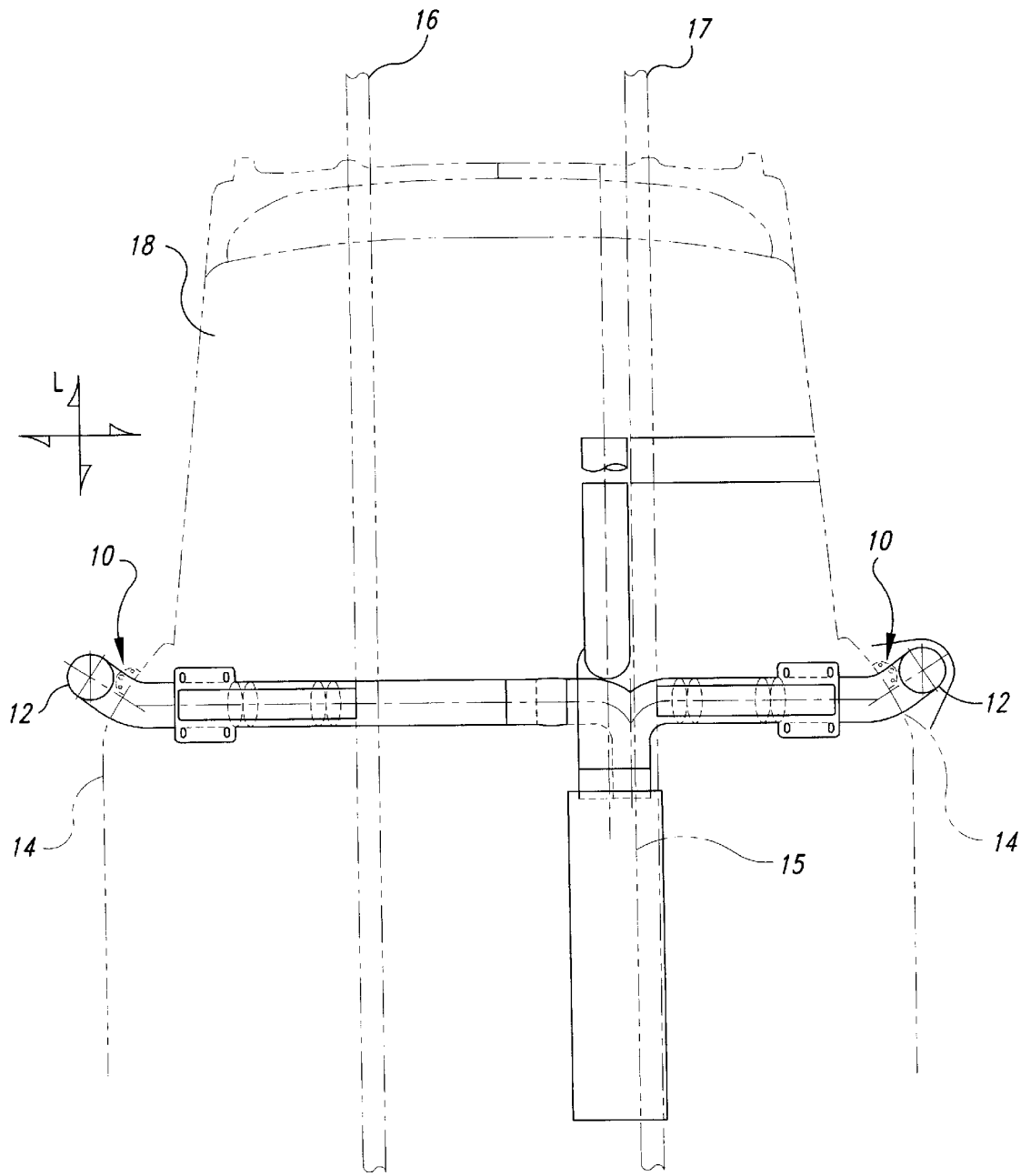
FIG. 1 is a top view of a connector in accordance with the invention attached to an exhaust pipe and a truck.

FIG. 1 illustrates the connector 10 securing an exhaust pipe 12 to the wall 14 of a truck cab 18. The exhaust pipes 12 and cab 18 are separately mounted to two longitudinal members 16 and 17 that make up part of the frame of the truck cab 18. A muffler 15 is rigidly mounted to the frame member 17 so that the general motion of the frame member 17 is imparted to the exhaust pipes 12. The cab 18, however, is mounted to a separate air suspension system (not shown) on the frame members 16 and 17 to provide a smoother ride. Accordingly, the cab 18 and exhaust pipes 12 often move in different directions with respect to one another, causing substantial lateral displacement (indicated by the arrows L) between the exhaust pipes 12 and cab walls 14. A significant amount of vertical displacement also occurs between the exhaust pipe 12 and cab wall 14. Such vertical displacement is in a direction that is perpendicular to the plane defined by the arrows L. The connector 10 allows a significant amount of vertical displacement to occur between the exhaust pipe 12 and cab wall 14, while substantially preventing lateral displacement therebetween. The connector 10 also dampens the vibrations of the exhaust pipe 12 to reduce the amount of noise in the cab 18.

Figure 2:
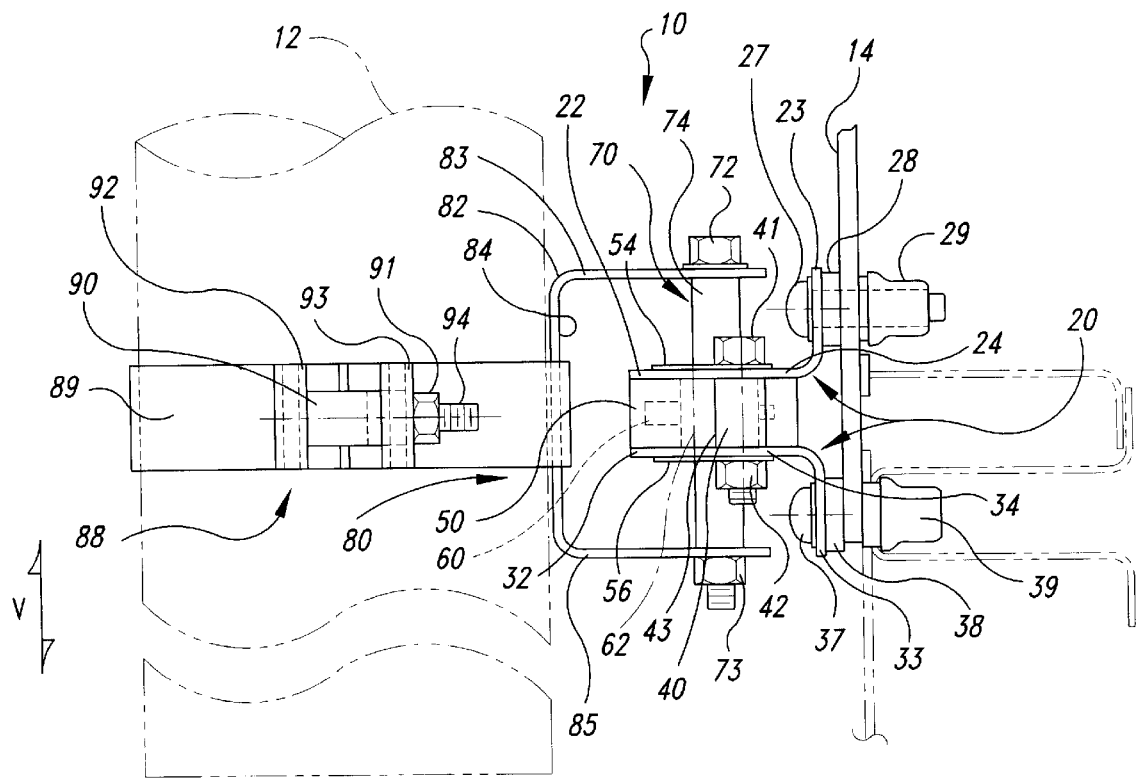
FIG. 2 is a side elevational view of a connector in accordance with the invention.
Figure 3:
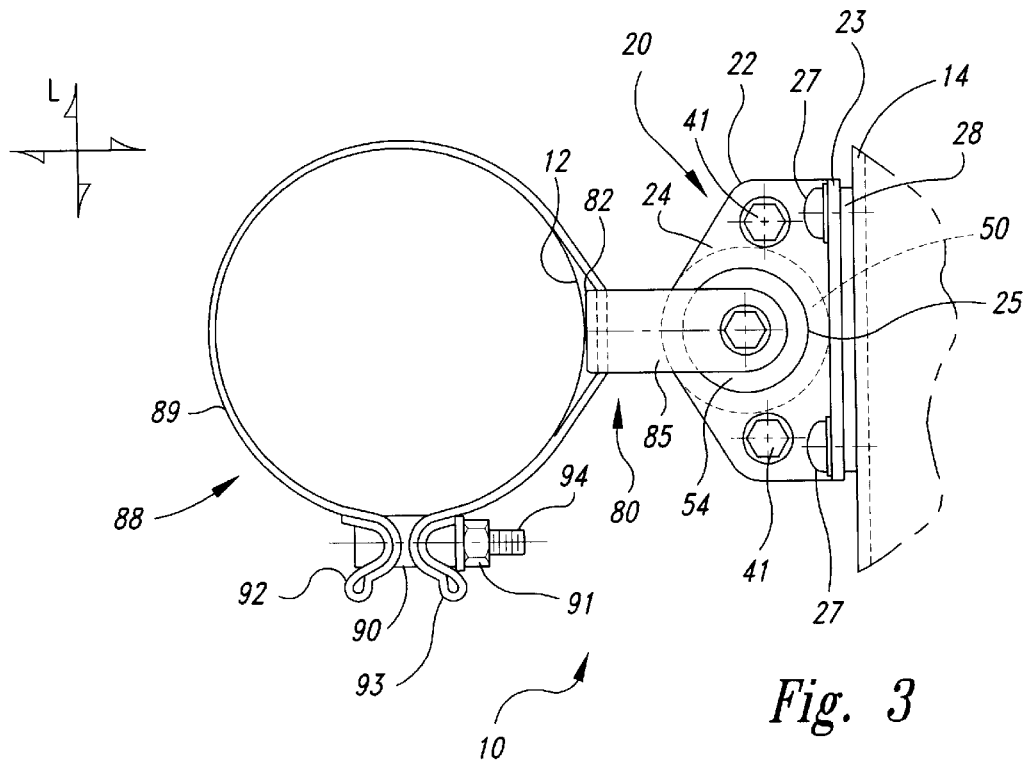
FIG. 3 is a top elevational view of the connector of FIG. 2.

FIGS. 2 and 3 illustrate one embodiment of the connector 10. The connector 10 includes a bracket 20, a resilient member 50, a rigid bushing 60, a rod 70, a clamp 80. The bracket 20 has an upper flange 22 with a horizontal leg 24 and a vertical foot 23, and a lower flange 32 with a horizontal leg 34 and a vertical foot 33. The upper flange 22 is attached to the wall 14 by a number of bolts 27 and nuts 29. The bolts 27 extend through the foot 23 and wall 14, and a nut 29 is threadedly attached to each bolt 27. The lower flange 32 is similarly attached to the wall 14 by a number of bolts 37 and nuts 39. A first washer 28 is placed between the upper foot 23 and wall 14, and a second washer 38 is placed between the lower foot 33 and wall 14. The washers 28 and 38 may be made from rubber or other similarly deformable material to dampen vibrations from the flanges 22 and 32 and to protect the wall 14 from being scratched by the bracket 20. Each flange 22 and 32 has a large hole 25 positioned through its leg for receiving a portion of the resilient member 50.

The upper and lower flanges 22 and 32 are spaced apart by a spacer 40. In one embodiment, the spacer includes a sleeve 43 and a bolt 41 positioned through a hole (not shown) in the sleeve 43. The sleeve 43 is positioned between the opposing surfaces of the upper and lower flanges 22 and 32, and the bolt 41 is positioned through small holes in the flanges and the opening in the sleeve 43. A nut 42 threadedly engages the lower portion of the bolt 41 to urge the upper and lower flanges 22 and 32 against the ends of the sleeve 43. The space between the opposing surfaces of the upper and lower flanges 22 and 32, therefore, is defined by the length of the sleeve 43. In a preferred embodiment, a spacer 40 is positioned on either side of the resilient member 50.

Figure 4:
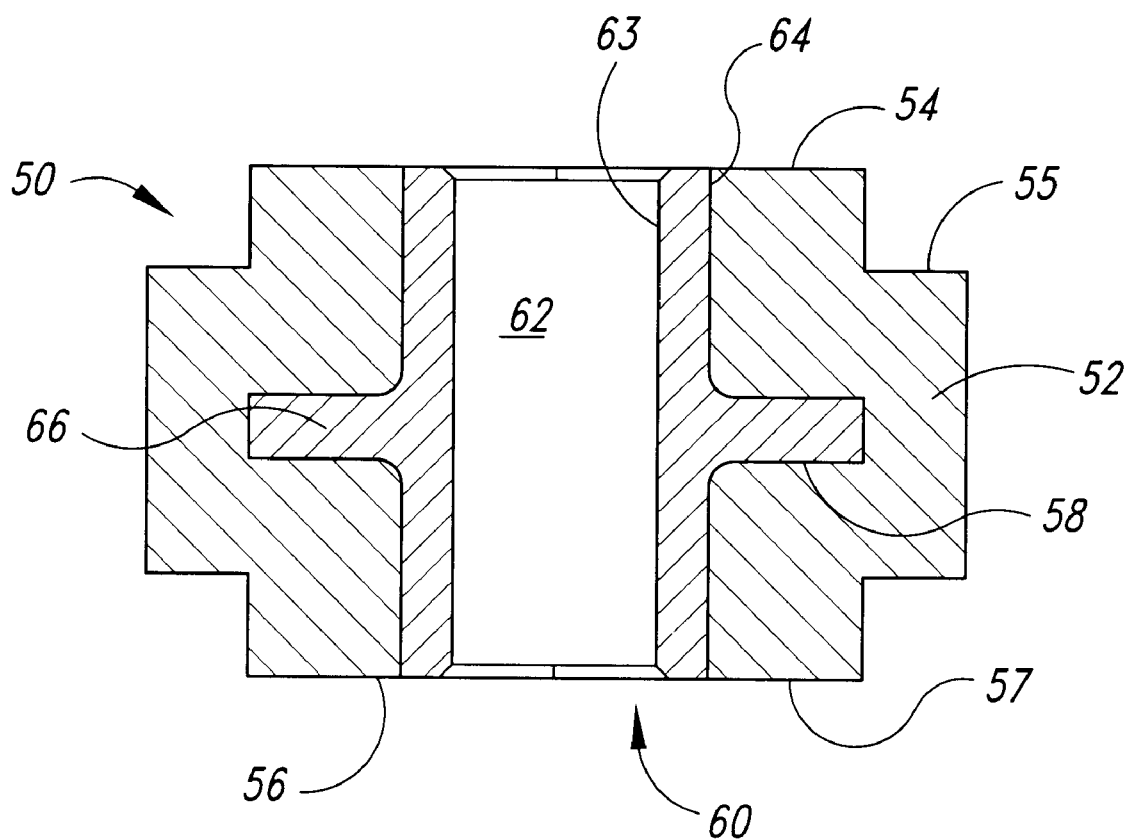
FIG. 4 is a cross section view of a resilient member and a rigid bushing in accordance with the invention.

The resilient member 50 is positioned in the space between the upper and lower flanges 22 and 32. Referring to FIG. 4, the resilient member 50 has a central body portion 52 from which an upper boss 54 extends upwardly and a lower boss 56 extends downwardly. The body 52 has an upper shoulder 55 around the upper boss 54 and a lower shoulder 57 around the lower boss 56. In a preferred embodiment, the body also has a kerf 58 positioned around its interior. The resilient member 50 is made from a deformable material that has good vibration dampening characteristics and is sufficiently durable to consistently return to its original shape after minor deformations. In a preferred embodiment, the resilient member 50 is made from a cast polyether-based thermoset polyurethane having a hardness of about 40–70 Shore A.

The rigid bushing 60 is coupled to the resilient member 50. The resilient member 50 and rigid bushing 60 are preferably coupled together by molding the resilient member 50 around the rigid bushing 60 so that the two parts become a single piece. The rigid member 60 has an outer wall 64, an inner wall 63, and a hole 62 that is defined by the inner wall 63. The hole 62 is generally positioned to extend vertically through the rigid bushing 60. In a preferred embodiment, an annular shoulder 66 extends around the outer wall 64, and the rigid bushing 60 is coupled to the resilient member 50 so that the annular shoulder 66 is positioned within the kerf 58. The upper and lower edges of the rigid bushing 60 are preferably flush with the surfaces of the upper boss 54 and the lower boss 56, respectively. The rigid bushing 60 is preferably made from a hard material that has self-lubricating, particles, such as graphite, embedded in its structure. One type of suitable material is an acetyl copolymer such as Delrin®, manufacture by DuPont de Nemours, Inc.

The scope of the invention is not limited to the specific materials disclosed above, and other suitable materials may be used to make the resilient member 50 and the rigid bushing 60. The scope of the invention is also not limited to the configuration of the resilient member 50 and rigid bushing 60 shown in FIG. 4. The resilient member 50 and rigid bushing, 60 may be shaped differently and may be coupled together by mechanical or other adhesive means. The central aspects of the invention with respect to the resilient member are that it be made from a deformable, vibration dampening material, and that it be coupled to the rigid bushing in a manner that separates the cab 18 from the vibrations of the exhaust pipe 12.

Referring, to FIGS. 2–4, the resilient member 50 is positioned in the space between tile upper and lower flanges 22 and 32 so that tile upper boss 54 extends through the hole 25 in the upper flange 22 and the lower boss 56 extends through the hole 25 in the lover flange 32. The body 52 preferably has a thickness that is slightly greater than the length of the sleeve 43. Accordingly, the lower surface of the leg 24 abuts the upper shoulder 55, and the upper surface of the leg 34 abuts the lower shoulder 57. The resilient member 50 is slightly compressed as the nuts 42 are tightened until the opposing, faces of the upper and lower flanges 22 and 32 abut the ends of the sleeves 43. Accordingly, the spacer 40 acts to maintain the appropriate distance between the upper and lower flanges 22 and 32, and to ensure that the resilient member 50 is coupled securely to the flange 20.

Referring again to FIGS. 2 and 3, the clamp 80 includes a brace 82 and a clasp 88. The brace 82 is preferably C shaped channel member with an upper finger 83, a back 84, and a lower finger 85. The clasp 88 is preferably a band 89 that is coupled to the back 84. The ends of the band 89 are formed into a first tab 92 and a second tab 93, and fitting 90 is attached to the first tab 9. A stud 94 extends from the fitting 90 through the second tab 93, and nut 91 is threadedly attached to the stud 94. By rotating the nut 91 about tile stud 94, the tabs 92 and 93 are drawn together to fixedly secure the band 89 to the exhaust pipe 12. When the nut 91 is sufficiently tightened, the friction between the band 89 and exhaust pipe 12 fixedly attaches the clamp 80 to the pipe 12 so that there is no relative movement between the clamp 80 and the pipe 12.

A rod 70 is attached to the fingers 83 and 85, and it is positioned through the hole 62 of the rigid bushing 60. The clearance between tile rod 70 and the inner we 63 is nominal to prevent the rod 70 from moving laterally with respect to the bushing 60. The rod preferably has a sleeve 74 positioned between the opposing surfaces often upper and lower fingers 83 and 85, and a bolt 72 that is positioned through a series aligned holes in tile upper finger 83, sleeve 74, and lower finger 85. A nut 73 threadedly attached to the lower portion of the bolt 72 to draw the upper and lower fingers 83 and 85 towards each other into contact with the ends of the sleeve 74. By sufficiently tightening the nut 73, the rod 70 is securely attached to the brace 82 so that there is no relative movement between the rod 70 and the exhaust pipe 12.

In operation, the rod 70 moves axially through the hole 62 of the rigid bushing 60 to freely accommodate any vertical displacement between the cab wall 14 and the pipe 12 (indicated by the arrows V in FIG. 2). The rod 70, however, is substantially prevented from moving laterally with respect to the exhaust pipe 12 or cab wall 14 (indicated by the arrows L in FIG. 3). Accordingly, by rigidly fixing the band 89 to the exhaust pipe 12 and rigidly fixing the bracket 20 to the cab wall 14, the close tolerance between the rod 70 and the inner wall 63 of the rigid bushing 60 substantially prevents lateral movement between the exhaust pipe 12 and the cab wall 14. Some angular displacement is allowed between the rod 70 and the upper and lower flanges 23 and 32 by the slight deformability of the resilient member 50. The angular displacement is necessary because the exhaust pipe and cab tend to have some minor angular displacement with respect to one another in addition to the vertical and lateral displace.

Therefore, the connector 10 allows significant vertical displacement between the exhaust pipe 12 and cab wall 14, while substantially preventing any lateral displacement therebetween. The connector 10 also reduces the noise level in the cab because it is positioned to isolate the exhaust pipe 12 from the cab 18, and it is made from a material that absorbs a significant amount of the vibrations from the exhaust pipe 12.

In another embodiment of the invention (not shown), the rod 70 may be attached to the bracket 20, and the resilient member 50 may be coupled to the brace 82. As such, the invention encompasses a connector for mounting a vertical exhaust pipe to a truck cab that has a bracket, a clamp, and a means for coupling the bracket to the clamp that allows for significant vertical displacement between the exhaust pipe and the cab while substantially preventing lateral movement therebetween. One such coupling means is the device shown in FIGS. 1–4. Other coupling means include, but are not limited to, resilient rolling members that roll within a channel or along a track. It will be appreciated that still other coupling means will be within the scope of the invention so long as they allow significant vertical displacement between the exhaust pipe and the cab while substantially preventing lateral movement therebetween.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A connector for mounting a vertical exhaust pipe to a truck cab, comprising:
    a bracket mountable to the cab;
    a resilient member coupled to the bracket, the resilient member being made from a material that dampens vibrations;
    a rigid bushing coupled to the resilient member;
    a rod having an upper end and a lower end, the rod being positioned through the bushing so that the upper and lower ends extend axially outwardly from the bushing, the rod being fitted to the bushing to prevent the rod from moving laterally with respect to the bushing, and the rod being freely movable axially through the bushing and the resilient member along at least a portion of the rod between the upper and the lower ends corresponding to vertical displacement between the exhaust pipe and the cab; and
    a clamp having a brace and a clasp, the brace being attached to an end of the rod and the clasp being attached to the brace and fixedly attachable to the exhaust pipe, wherein the rod is axially moveable through the bushing and the resilient member to correspond to vertical displacement between the cab and the exhaust pipe while being substantially prevented from moving laterally.

2. The connector of claim 1 wherein the bracket has a flange extending away from the cab, the resilient member being coupled to the flange.

3. The connector of claim 1 wherein the bracket has an upper flange and lower flange, the resilient member being coupled to the upper and lower flanges.

4. The connector of claim 3 further comprising a spacer positioned between the upper and lower flanges, the spacer maintaining a substantially constant space between the flanges.

5. The connector of claim 1 wherein the resilient member is formed around the rigid bushing.

6. The connector of claim 5 wherein the bushing is substantially cylindrical and has an inner wall and an outer wall, the resilient member being formed around the outer wall.

7. The connector of claim 6 wherein the resilient member comprises substantially cylindrical body, an upper boss extending upwardly from the body and a lower boss extending downwardly from the body.

8. The connector of claim 1 wherein the resilient member is made from polyurethane material.

9. The connector of claim 1 wherein the brace is C-shaped.

10. The connector of claim 1 wherein the rod comprises a sleeve and a bolt extending through the sleeve, the sleeve being positioned adjacent the brace and the be connecting the sleeve to the brace.

11. A connector for mounting a vertical exhaust pipe to a truck cab, comprising:
    a cab-engaging bracket having an upper flange and a lower flange;
    a resilient member having a substantially cylindrical body, an upper boss extending upwardly from the body, and a lower boss extending downwardly from the body, the upper boss being received in a hole in the upper flange of the bracket and the lower boss being received in a hole in the lower flange of the bracket;
    a substantially cylindrical rigid bushing having an inner wall and an outer wall, the resilient member being formed around the outer wall of the rigid bushing;
    a rod having a brace and a clasp, the brace being attached to an end of the rod and the clasp being attached to the brace, wherein the clasp is fixedly attachable to the exhaust pipe such that the rod is axially moveable through the bushing to correspond to vertical displacement between the cab and the exhaust pipe while being substantially prevented from moving laterally.

12. A connector for mounting a vertical exhaust pipe to a truck cab, comprising:
    a cab-engaging bracket having an upper flange and a lower flange;
    a resilient member coupled to the upper and lower flanges of the bracket;
    a rigid bushing coupled to the resilient member;
    a rod having an upper end and a lower end, the rod being positioned through the bushing;
    a spacer having a sleeve positioned between the upper and lower flanges and a bolt extending through the flanges and the sleeve, the bolt urging the flanges against the sleeve to hold the resilient member between the flanges; and
    a clamp having a brace and a clasp, the brace being attached to an end of the rod and the clasp being attached to the brace wherein the clasp is fixedly attachable to the exhaust pipe such that the rod is axially moveable through the bushing to correspond to vertical displacement between the cab and the exhaust pipe while being substantially prevent from moving laterally.

13. A connector for mounting a vertical exhaust pipe to a truck cab, comprising:
    a bracket mountable to the cab;
    a clamp having a brace and a clasp, the clasp being attachable to the exhaust pipe; and means for coupling the brace to the bracket, the coupling means dampening vibrations from the exhaust pipe to the cab and allowing unrestricted vertical displacement between the brace and the bracket corresponding to vertical displacement between the exhaust pipe and the cab while substantially preventing lateral movement therebetween.

14. The connector of claim 13 wherein the coupling means comprise a resilient member coupled to one of the bracket and the brace, a rigid bushing coupled to the resilient member, and a rod connected to the other of the bracket and the brace, the rod being positioned and axially moveable through the bushing.

15. The connector of claim 14 wherein the resilient member is coupled the bracket and the rod is coupled to the brace.

16. The connector of claim 13 wherein the resilient member is made from thermoset polyurethane.

17. The connector of claim 13 wherein the bushing is made from an acetal copolymer.

18. A connector for mounting a vertical exhaust pipe to a truck cab, comprising:
  a cab-engaging bracket mountable to the cab;
  a resilient member coupled to the bracket, the resilient member being made from a material that dampens vibrations;
  a low-friction bushing coupled to the resilient member;
  a rod positioned through and engaging the low-friction bushing, the rod having an upper end and a lower end; and
  a clamp having a brace and a clasp attached to the brace, the brace being attached to an end of the rod and the clasp being fixedly attachable to the exhaust pipe, wherein the rod is freely axially moveable through the low-friction bushing along a length corresponding to vertical displacement between the exhaust pipe and the cab while being restricted from moving laterally with respect to the low-friction bushing.

19. The connector of claim 18 wherein the resilient member is formed around the low-friction bushing.

20. A connector for mounting a vertical exhaust pipe to a truck cab, comprising:
  a cab-engaging bracket mountable to the cab, the bracket having an upper flange and a lower flange;
  a resilient member coupled to the bracket, the resilient member having an upper boss positioned in a hole of the upper flange and a lower boss positioned in a hole in the lower flange, the resilient member being made from a material that dampens vibrations;
  a low-friction bushing coupled to the resilient member, the bushing being positioned within the resilient member to separate the rod from the resilient member;
  a rod positioned through and engaging the low-friction bushing, the rod having an upper end and a lower end; and
  a clamp having a brace and a clasp attached to the brace, the brace being attached to an end of the rod and the clasp being fixedly attachable to the exhaust pipe, wherein the rod is freely axially moveable through the low-friction bushing while being substantially prevented from moving laterally with respect to the low-friction bushing and the resilient member.

* * * * *